(12) United States Patent
Shiraishi et al.

(10) Patent No.: US 11,167,476 B2
(45) Date of Patent: *Nov. 9, 2021

(54) METHOD FOR MANUFACTURING THREE-DIMENSIONALLY SHAPED OBJECT AND THREE-DIMENSIONALLY SHAPING DEVICE

(71) Applicant: KONICA MINOLTA, INC., Tokyo (JP)

(72) Inventors: Masaharu Shiraishi, Yokohama (JP); Kazuya Isobe, Hachioji (JP); Kazufumi Yamazaki, Saitama (JP)

(73) Assignee: KONICA MINOLTA, INC., Tokyo (JP)

( * ) Notice: Subject to any disclaimer, the term of this patent is extended or adjusted under 35 U.S.C. 154(b) by 378 days.

This patent is subject to a terminal disclaimer.

(21) Appl. No.: 16/348,298

(22) PCT Filed: Aug. 31, 2017

(86) PCT No.: PCT/JP2017/031341
§ 371 (c)(1),
(2) Date: May 8, 2019

(87) PCT Pub. No.: WO2018/087999
PCT Pub. Date: May 17, 2018

(65) Prior Publication Data
US 2019/0308369 A1    Oct. 10, 2019

(30) Foreign Application Priority Data

Nov. 10, 2016 (JP) .............................. JP2016-219943

(51) Int. Cl.
*B29C 64/153*    (2017.01)
*B29C 64/268*    (2017.01)
(Continued)

(52) U.S. Cl.
CPC .......... *B29C 64/153* (2017.08); *B29C 64/268* (2017.08); *B29C 64/393* (2017.08);
(Continued)

(58) Field of Classification Search
CPC ... B29C 64/153; B29C 64/268; B29C 64/393; B33Y 10/00; B33Y 30/00; B33Y 50/02; B33Y 70/00
See application file for complete search history.

(56) References Cited

U.S. PATENT DOCUMENTS

| | | | |
|---|---|---|---|
| 2006/0192315 A1* | 8/2006 | Farr ....................... | B33Y 10/00 264/113 |
| 2018/0154437 A1* | 6/2018 | Mark .................... | B22F 1/0059 |
| 2020/0032006 A1* | 1/2020 | Mizoguchi ............ | B29C 64/393 |

FOREIGN PATENT DOCUMENTS

JP    2016107554 A    6/2016

OTHER PUBLICATIONS

International Search Report dated Oct. 3, 2017 for PCT/JP2017/031341 and English translation.

* cited by examiner

*Primary Examiner* — Nahida Sultana
(74) *Attorney, Agent, or Firm* — Lucas & Mercanti, LLP

(57) ABSTRACT

A method for manufacturing a three-dimensionally shaped object includes: forming a thin layer of a powder material containing core-shell type resin particles containing a core resin and a shell resin with a storage elastic modulus G' of $1 \times 10^{8.0}$ Pa or more at a temperature $Tc_{(7.0)}$ at which the storage elastic modulus G' of the core resin is $1 \times 10^{7.0}$ Pa; selectively irradiating the formed thin layer with laser light to form a shaped object layer in which the resin particles contained in the powder material are sintered or fused; and a step of performing the step of forming the thin layer and the step of forming the shaped object layer in this order a (Continued)

plurality of times to laminate the shaped object layer. In the forming of the shaped object layer, a surface temperature of the thin layer is higher than $Tc_{(7.0)}$.

16 Claims, 4 Drawing Sheets

(51) Int. Cl.
 *B33Y 10/00* (2015.01)
 *B33Y 30/00* (2015.01)
 *B33Y 50/02* (2015.01)
 *B29C 64/393* (2017.01)
(52) U.S. Cl.
 CPC ............... *B33Y 10/00* (2014.12); *B33Y 30/00* (2014.12); *B33Y 50/02* (2014.12)

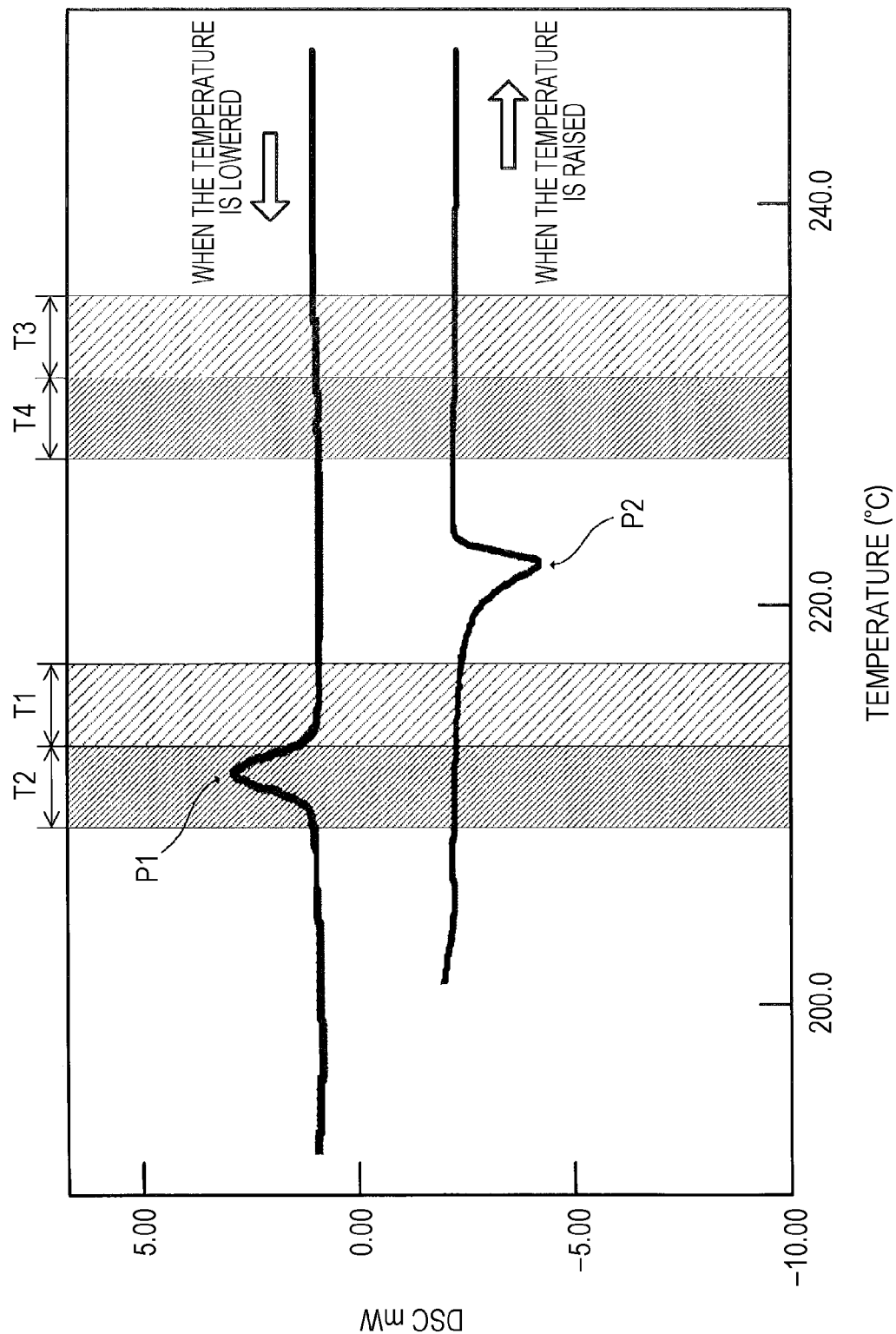

METHOD FOR MANUFACTURING THREE-DIMENSIONALLY SHAPED OBJECT AND THREE-DIMENSIONALLY SHAPING DEVICE

CROSS REFERENCE TO RELATED APPLICATION

This Application is a 371 of PCT/JP2017/031341 filed on Aug. 31, 2017 which, in turn, claimed the priority of Japanese Patent Application No. 2016-219943 filed on Nov. 10, 2016, both applications are incorporated herein by reference.

TECHNICAL FIELD

The present invention relates to a method for manufacturing a three-dimensionally shaped object and a three-dimensionally shaping device.

BACKGROUND ART

In recent years, various methods capable of relatively easily manufacturing a three-dimensionally shaped object having a complicated shape have been developed. As one method for manufacturing a three-dimensionally shaped object, a powder bed fusion method is known. The powder bed fusion method is characterized by high shaping accuracy and high bonding strength between laminated layers. Therefore, the powder bed fusion method can be used not only for manufacturing a prototype for confirming the shape or property of a final product but also for manufacturing the final product.

In the powder bed fusion method, a powder material containing particles including a resin material or a metal material is spread flatly to form a thin film, a desired position on the thin film is irradiated with a laser, and the particles contained the powder material are selectively sintered or melted to be bonded to each other (hereinafter bonding of particles by sintering or melting is simply referred to as "fusion") to form one of layers (hereinafter also simply referred to as "shaped object layers") obtained by finely dividing a three-dimensionally shaped object in a thickness direction. The powder material is further spread on the layer thus formed and irradiated with a laser to selectively fuse the particles contained in the powder material to form a next shaped object layer. By repeating this procedure and laminating the shaped object layer, a three-dimensionally shaped object having a desired shape is manufactured.

A particle having a temperature that has risen due to laser irradiation may change the volume thereof largely. This volume change is significant in a particle containing a resin material (hereinafter also simply referred to as a "resin particle"). In order to suppress reduction in accuracy of the shaped object due to this volume change, the powder material may be preheated. At this time, for example, as described in Patent Literature 1, the powder material is preheated to a temperature slightly lower than the melting temperature thereof.

CITATION LIST

Patent Literature

Patent Literature 1: JP2016-107554 A

SUMMARY OF INVENTION

Technical Problem

As described in Patent Literature 1, if the powder material containing resin particles is preheated to a temperature lower than the melting temperature thereof, reduction in accuracy of the shaped object due to a volume change of the particles during laser irradiation is unlikely to occur. At this time, the powder material is usually preheated to a temperature at which the storage elastic modulus G' thereof is $1 \times 10^{7.0}$ Pa or less in order to suppress reduction in shaping accuracy due to deformation of the resin particles having elastic modulus reduced.

However, even if the powder material is preheated to the above temperature, the volume change of the resin particles does not completely disappear when the resin particles are melted by laser irradiation, and reduction in accuracy of the shaped object due to the volume change is not eliminated. When the powder material is preheated to the above temperature, the temperature of a shaped object layer formed by fusion may be locally lowered depending on a temperature distribution in the layer, the shaped object layer may locally shrink, and accuracy of the shaped object may be reduced. When the local volume shrinkage occurs, the strength of the shaped object is also reduced.

The present invention has been achieved in view of the above problems, and an object of the present invention is to provide a method for manufacturing a three-dimensionally shaped object capable of manufacturing a shaped object with higher accuracy than in conventional art, and a three-dimensionally shaping device capable of performing such a method for manufacturing a three-dimensionally shaped object.

Solution to Problem

The present invention relates to a method for manufacturing a three-dimensionally shaped object and a three-dimensionally shaping device, described below.

[1] A method for manufacturing a three-dimensionally shaped object, the method including: a step of forming a thin layer of a powder material containing core-shell type resin particles containing a core resin and a shell resin with a storage elastic modulus G' of $1 \times 10^{8.0}$ Pa or more at a temperature $Tc_{(7.0)}$ at which the storage elastic modulus G' of the core resin is $1 \times 10^{7.0}$ Pa; a step of selectively irradiating the formed thin layer with laser light to form a shaped object layer in which the resin particles contained in the powder material are sintered or fused; and a step of performing the step of forming the thin layer and the step of forming the shaped object layer in this order a plurality of times to laminate the shaped object layer, in which in the step of forming the shaped object layer, a surface temperature of the thin layer is higher than $Tc_{(7.0)}$.

[2] A method for manufacturing a three-dimensionally shaped object, the method including: a step of forming a thin layer of a powder material containing core-shell type resin particles containing a core resin and a shell resin in which a temperature $Ts_{(8.0)}$ at which a storage elastic modulus G' is $1 \times 10^{8.0}$ Pa is higher than a temperature $Tc_{(7.0)}$ at which the storage elastic modulus G' of the core resin is $1 \times 10^{7.0}$ Pa; a step of selectively irradiating the formed thin layer with laser light to form a shaped object layer in which the resin particles contained in the powder material are sintered or fused; and a step of performing the step of forming the thin layer and the step of forming the shaped object layer in this order a plurality of times to laminate the shaped object layer, in which in the step of forming the shaped object layer, a surface temperature of the thin layer is higher than $Tc_{(7.0)}$.

[3] The method for manufacturing a three-dimensionally shaped object according to [1] or [2], in which in the step of forming the shaped object layer, the surface temperature of the thin layer is lower than a temperature $Ts_{(7.0)}$ at which the storage elastic modulus G' of the shell resin is $1 \times 10^{7.0}$ Pa.

[4] The method for manufacturing a three-dimensionally shaped object according to [1] or [2], in which in the step of forming the shaped object layer, the surface temperature of the thin layer is lower than a temperature at which a mass change ratio is 10% when the core-shell type resin particles are held for 10 minutes.

[5] The method for manufacturing a three-dimensionally shaped object according to any one of [1] to [4], in which the core resin has an average particle diameter of 10 μm or more and 100 μm or less.

[6] The method for manufacturing a three-dimensionally shaped object according to any one of [1] to [5], in which each of the core resin and the shell resin is selected from the group consisting of a high density polyethylene (HDPE), a low density polyethylene (LDPE), polypropylene (PP), a nylon resin (PA), polyacetal (POM), polybutylene terephthalate (PBT), polyphenylene sulfide (PPS), polyether ether ketone (PEEK), a liquid crystal polymer (LCP), polystyrene (PS), polyvinyl chloride (PVC), an ABS resin, an acrylic resin (PMMA), polycarbonate (PC), polyarylate (PAR), and modified polyphenylene ether (PPE).

[7] A three-dimensionally shaping device including: a shaping stage; a thin film former that forms a thin film of a powder material containing core-shell type resin particles containing a core resin and a shell resin with a storage elastic modulus G' of $1 \times 10^{8.0}$ Pa or more at a temperature $Tc_{(7.0)}$ at which the storage elastic modulus G' of the core resin is $1 \times 10^{7.0}$ Pa on the shaping stage; a preheater that makes a surface temperature of the formed thin layer of the powder material higher than $Tc_{(7.0)}$; a laser irradiator that irradiates the thin film with a laser to form a shaped object layer in which the particles are sintered or fused; a stage support that supports the shaping stage such that a position thereof in the vertical direction is variable; and a controller that controls the thin film former, the laser irradiator, and the stage support to repeatedly form and laminate the shaped object layer.

[8] A three-dimensionally shaping device including: a shaping stage; a thin film former that forms a thin film of a powder material containing core-shell type resin particles containing a core resin and a shell resin in which a temperature $Ts_{(8.0)}$ at which a storage elastic modulus G' is $1 \times 10^{8.0}$ Pa is higher than a temperature $Tc_{(7.0)}$ at which the storage elastic modulus G' of the core resin is $1 \times 10^{7.0}$ Pa on the shaping stage; a preheater that makes a surface temperature of the formed thin layer of the powder material higher than $Tc_{(7.0)}$; a laser irradiator that irradiates the thin film with a laser to form a shaped object layer in which the particles are sintered or fused; a stage support that supports the shaping stage such that a position thereof in the vertical direction is variable; and a controller that controls the thin film former, the laser irradiator, and the stage support to repeatedly form and laminate the shaped object layer.

Advantageous Effects of Invention

The present invention provides a method for manufacturing a three-dimensionally shaped object capable of manufacturing a shaped object with higher accuracy than in conventional art, and a three-dimensionally shaping device capable of performing such a method for manufacturing a three-dimensionally shaped object.

BRIEF DESCRIPTION OF DRAWINGS

FIG. 1 is a graph illustrating a relationship between an example of a measurement result of differential scanning calorimetry (DSC) on a crystalline thermoplastic resin and a preheating temperature.

DESCRIPTION OF EMBODIMENTS

Figure 2A:
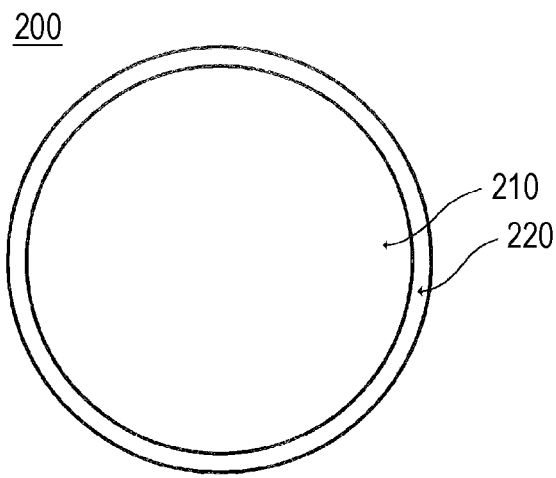
FIGS. 2A and 2B are schematic cross-sectional views illustrating a form of a core-shell particle in an embodiment of the present invention.

In order to solve the above problems, the present inventors made intensive studies and experiments and have completed the present invention relating to a method for further enhancing accuracy of a three-dimensionally shaped object to be manufactured by preheating a powder material containing core-shell type resin particles (hereinafter also simply referred to as "core-shell particles") containing a core resin and a shell resin hardly deformable to a temperature higher than the core resin to a temperature higher than a temperature at which a storage elastic modulus G' of the core resin as a main material of a three-dimensionally shaped object is $1 \times 10^{7.0}$ Pa (hereinafter also simply referred to as "$Tc_{(7.0)}$").

In other words, the powder material used in the method for manufacturing a three-dimensionally shaped object according to an embodiment of the present invention contains core-shell type resin particles (core-shell particles) containing a core resin and a shell resin, and the shell resin has a storage elastic modulus G' of $1 \times 10^{8.0}$ Pa or more at the temperature $Tc_{(7.0)}$.

When a three-dimensionally shaped object is manufactured by a powder bed fusion method using resin particles, when a preheating temperature is low, a volume (specific volume) change ratio of the resin is large when the resin particles are heated by laser irradiation. Therefore, the volume of the resin particles largely changes during laser irradiation, the resin particles are deformed, and accuracy of a three-dimensionally shaped object is reduced. Meanwhile, when the preheating temperature is raised, the resin particles are excessively softened and deformed before laser irradiation, and the accuracy of the three-dimensionally shaped object is also reduced.

Here, the hardness of a viscoelastic body containing a resin can be represented by a storage elastic modulus G'. The storage elastic modulus G' of a resin is lower as the temperature is higher. When the storage elastic modulus G' of resin particles is $1 \times 10^{6.5}$ Pa or less, the resin particles are easily deformed due to softening. In order to suppress deformation of the resin particles due to a large volume change ratio when the preheating temperature is low and to fuse the resin particles contained in the powder material by laser irradiation for a shorter time, the preheating temperature is preferably higher than a temperature at which the resin particles start to be softened (the storage elastic modulus G' becomes $1 \times 10^{6.5}$ Pa). However, at the above temperature, deformation of the resin particles at the high temperature (deformation due to softening of the resin particles) slightly occurred, and accuracy in three-dimensional shaping was not enhanced to a desired level.

Meanwhile, in manufacture of a three-dimensionally shaped object, when a thin layer of a powder material containing the core-shell particles is formed and preheated such that a surface temperature of the thin layer is higher than $Tc_{(7.0)}$, the core resin has a storage elastic modulus G' of $1\times10^{7.0}$ Pa or less and is softened before laser irradiation. Therefore, a volume change of the core resin during laser irradiation is small. Meanwhile, during the preheating, the storage elastic modulus G' of the shell resin is higher. Therefore, the shell resin is not softened as much as the core resin. The shapes of the core-shell particles can be maintained. Therefore, during the preheating, reduction in accuracy of a three-dimensionally shaped object due to deformation of softened core-shell particles or fusion of the softened core-shell particles is unlikely to occur.

Incidentally, as described below, when preheating is performed to the above temperature, reduction in accuracy of a three-dimensionally shaped object due to cooling of the formed shaped object layer is unlikely to occur.

FIG. 1 is a graph illustrating a relationship between an example of a measurement result of differential scanning calorimetry (DSC) on a crystalline thermoplastic resin and a preheating temperature. As illustrated in FIG. 1, an endothermic peak P1 due to crystallization or the like appearing when a thermoplastic resin is cooled and the temperature thereof is lowered usually exists in a temperature region lower than an endothermic peak P2 due to melting appearing when the thermoplastic resin is heated and the temperature thereof is raised. Incidentally, in resin particles used in a powder bed fusion method, a volume change of the thermoplastic resin with these peaks as boundaries is usually observed.

Here, when a three-dimensionally shaped object is manufactured using a powder material containing conventional resin particles containing only the thermoplastic resin by a powder bed fusion method, the powder material is preheated to a temperature region T1 slightly lower than the endothermic peak P2 appearing when the temperature of the thermoplastic resin is raised in order to facilitate melting during laser irradiation. At this time, when temperature unevenness occurs in a thin layer of the powder material, a part of the shaped object layer formed by laser irradiation may be locally cooled to a lower temperature region T2. When the locally cooled region is lower than the endothermic peak P1 appearing when the temperature of the thermoplastic resin is lowered, the thermoplastic resin constituting the shaped object layer in the region may locally shrink, and the shaped object layer may be warped. When shrinkage occurs locally, the strength of the shaped object layer is reduced at a boundary between a shrunk region and a non-shrunk region, and the strength (for example, resistance to tensile) of a three-dimensionally shaped object may be reduced.

Meanwhile, by manufacturing a three-dimensionally shaped object using a powder material containing core-shell particles in which a thermoplastic resin having the thermal behavior illustrated in FIG. 1 is used as a core resin and the periphery thereof is coated with a shell resin to be softened at a higher temperature, the powder material can be preheated to a higher temperature region T3. As a result, even if the formed shaped object layer is locally cooled to a lower temperature region T4 due to temperature unevenness in a manufacturing device, the temperature of the shaped object layer does not become lower than the endothermic peak P1 appearing when the temperature of the thermoplastic resin is lowered. Therefore, it is considered that occurrence of warpage in the shaped object layer due to local shrinkage of the thermoplastic resin constituting the shaped object layer and reduction in strength of the three-dimensionally shaped object can be suppressed.

In manufacture of a three-dimensionally shaped object using the powder material containing the core-shell particles, if preheating is performed to a higher temperature region T3, the core resin can be more sufficiently softened before laser irradiation. As a result, the core-shell particles can be fused by laser irradiation to such an extent as to melt the shell resin. Therefore, a shaped object layer can be formed by laser irradiation in a shorter time, and a manufacturing speed of a three-dimensionally shaped object can be increased.

Furthermore, in manufacture of a three-dimensionally shaped object using the powder material containing the core-shell particles, if preheating is performed to the temperature region T3, the formed shaped object layer can exist in a softened state to some extent. This makes it easier to bond the softened shaped object layers to each other while the shape of the formed shaped object layer is maintained when a next shaped object layer is laminated on a previously formed shaped object layer. Therefore, when preheating is performed in the higher temperature region T3 using the powder material, bonding between layers of the manufactured three-dimensionally shaped object is also strengthened, and the strength of the three-dimensionally shaped object can be increased.

Hereinafter, a representative embodiment of the present invention will be described in detail.

1. Method for Manufacturing Three-Dimensionally Shaped Object

The present embodiment relates to a method for manufacturing a three-dimensionally shaped object using a powder material containing the core-shell particles. The method according to the present embodiment can be performed similarly to an ordinary powder bed fusion method except that the above powder material is used and a preheating temperature is higher than $Tc_{(7.0)}$. Specifically, the method according to the present embodiment includes: (1) a step of forming a thin layer of the powder material; (2) a step of selectively irradiating the preheated thin layer with laser light to form a shaped object layer in which resin particles having a core-shell structure and contained in the powder material are fused; and (3) a step of repeating steps (1) and (2) in this order a plurality of times to laminate the shaped object layer. In step (2), one of shaped object layers to constitute a three-dimensionally shaped object is formed. Furthermore, by repeating steps (1) and (2) in step (3), a next layer of the three-dimensionally shaped object is laminated to manufacture the final three-dimensionally shaped object.

1-1. Step of Forming Thin Layer Containing Powder Material (Step (1))

In this step, a thin layer of a powder material containing the core-shell particles is formed. For example, the powder material supplied from a powder supply unit is spread flatly on a shaping stage with a recoater. The thin layer may be formed directly on the shaping stage or may be formed so as to be in contact with the powder material that has been spread or a shaped object layer that has been formed.

1-1-1. Powder Material

The powder material contains core-shell type resin particles containing a core resin and a shell resin with a storage elastic modulus G' of $1\times10^{8.0}$ Pa or more at a temperature $Tc_{(7.0)}$ at which the storage elastic modulus G' of the core resin is $1\times10^{7.0}$ Pa. The powder material may further contain a material or particles other than the mother particles and child particles adhering to the mother particles, such as a laser absorbent or a flow agent as long as dense filling of resin particles is not significantly interfered when fusion is performed and a thin layer is formed by laser irradiation, and accuracy of a three-dimensionally shaped object is not significantly reduced.

1-1-1-1. Resin Particle

The resin particle includes a core resin and a shell resin coating the core resin.

Materials of the core resin and the shell resin are not particularly limited and can be appropriately selected from known thermoplastic resins as long as the storage elastic modulus G' of the shell resin is $1\times10^{8.0}$ Pa or more at a temperature $Tc_{(7.0)}$ at which the storage elastic modulus G' of the core resin is $1\times10^{7.0}$ Pa.

Note that the storage elastic modulus of a thermoplastic resin in a temperature region in which preheating is performed with a known device used for a powder bed fusion method usually becomes lower as the temperature is higher. The core resin and the shell resin may be selected such that a temperature at which the storage elastic modulus G' of the shell resin is $1\times10^{8.0}$ Pa (hereinafter also simply referred to as "$Ts_{(8.0)}$") is higher than the temperature $Tc_{(7.0)}$ at which the storage elastic modulus G' of the core resin is $1\times10^{7.0}$ Pa from such a viewpoint.

Examples of materials of the core resin and the shell resin include a high density polyethylene (HDPE), a low density polyethylene (LDPE), polypropylene (PP), nylon (PA) including nylon 6 and nylon 12, polyacetal (POM), polybutylene terephthalate (PBT), polyphenylene sulfide (PPS), polyether ether ketone (PEEK), a known liquid crystal polymer (LCP), polystyrene (PS), polyvinyl chloride (PVC), an acrylonitrile/butadiene/styrene copolymer (ABS), an acrylic polymer including polymethyl methacrylate (PMMA), polycarbonate (PC), polyarylate (PAR), and modified polyphenylene ether (PPE). The core resin may contain only one type of thermoplastic resin or may contain two or more types of thermoplastic resins in combination. The powder material may contain only a single type of resin particles containing the same thermoplastic resin constituting the core resin, or two or more types of resin particles containing different types of thermoplastic resins constituting the core resin in combination.

The temperature ($Tc_{(7.0)}$) at which the storage elastic modulus G' of the core resin is $1\times10^{7.0}$ Pa, the temperature ($Ts_{(8.0)}$) at which the storage elastic modulus G' of the shell resin at $Tc_{(7.0)}$ is $1\times10^{8.0}$ Pa ($Ts_{(8.0)}$), and a temperature at which the storage elastic modulus G' of the shell resin is $1\times10^{7.0}$ Pa, described later (hereinafter also simply referred to as "$Ts_{(7.0)}$") may be values announced by a manufacturer supplying the resins or may be values obtained by measurement by a known method. Here, a value obtained by measurement using a storage elastic modulus measuring device (ARES-G2 rheometer manufactured by TA instruments Inc.) by the following method is defined as the storage elastic modulus G'.

(Preparation of Sample)

A core resin or a shell resin constituting a resin particle is separated and extracted with a solvent for dissolving only one of the core resin and the shell resin, and dried to make the core resin or the shell resin powdery. The resulting powder is pressed at 30 kN for one minute at normal temperature using a press-molding machine (NT-100H manufactured by NPa SYSTEM CO., LTD.) and molded into a cylindrical sample having a diameter of about 8 mm and a height of about 2 mm.

(Measurement Procedure)

The temperature of a parallel plate of the above device is adjusted to 150° C., and the prepared cylindrical sample is heated and melted. Thereafter, a load is applied to the sample in a perpendicular direction such that an axial force does not exceed 10 (g weight) to fix the sample to the parallel plate. In this state, the parallel plate and the cylindrical sample are heated up to a measurement starting temperature of 250° C., and viscoelasticity data is measured while the sample is gradually cooled. The measured data is transferred to a computer equipped with Microsoft Windows 7 ("Windows" is a registered trademark of Microsoft Corporation). Data transfer is performed through control, data collection, and analysis software (TRIOS) operating on the computer, and a value of storage elastic modulus G' (Pa) at each temperature is read.

(Measurement Conditions)

Measurement frequency: 6.28 rad/s.

Setting of measurement distortion: An initial value is set to 0.1%, and measurement is performed in an automatic measurement mode.

Elongation correction of sample: Adjustment is performed in an automatic measurement mode.

Measurement temperature: Cooling is gradually performed from 250° C. to 100° C. at a rate of 5° C. per minute.

Measurement interval: Viscoelasticity data is measured every 1° C.

When the powder material containing the core-shell particles is irradiated with a laser during shaping, the shell resin is softened, is melted, or disappears, and the core-shell particles are fused. A difference between a temperature at which the shell resin is softened, is melted, or disappears and a temperature at which the core resin is softened and melted is preferably small from a viewpoint of facilitating softening, disappearance, or melting of the shell resin during laser irradiation, facilitating fusion of resin particles having a core-shell structure, and making it possible to manufacture a three-dimensionally shaped object in a shorter time. Meanwhile, preferably, the difference in temperature is not too small from a viewpoint of suppressing deformation of the resin particles due to softening of the shell resin before laser irradiation. The difference in temperature can be estimated from a difference between the temperature ($Tc_{(7.0)}$) at which the storage elastic modulus G' of the core resin is $1\times10^{7.0}$ Pa and the temperature ($Ts_{(7.0)}$) at which the storage elastic modulus G' of the shell resin is $1\times10^{7.0}$ Pa. The difference between $Ts_{(7.0)}$ and $Tc_{(7.0)}$ is preferably 5° C. or more and 70° C. or less, more preferably 10° C. or more and 70° C. or less, still more preferably 10° C. or more and 60° C. or less, and further still more preferably 10° C. or more and 30° C. or less from such a viewpoint.

The temperature $Tc_{(7.0)}$ at which the storage elastic modulus G' of the core resin is $1\times10^{7.0}$ Pa is preferably within a range in which the temperature of the core resin can be adjusted by performing preheating with a known device used for a powder bed fusion method. $Tc_{(7.0)}$ is preferably 50° C. or higher and 300° C. or lower, more preferably 100° C. or higher and 300° C. or lower, still more preferably 100° C. or higher and 250° C. or lower, further still more preferably 140° C. or higher and 250° C. or lower, and further still more preferably 140° C. or higher and 200° C. or lower from the viewpoint.

The temperature $Ts_{(8.0)}$ at which the storage elastic modulus G' of the shell resin is $1\times10^{8.0}$ Pa is preferably within a temperature range in which melting is facilitated by laser light irradiation while the degree of freedom of selecting the core resin is secured. $Ts_{(8.0)}$ is preferably 100° C. or higher and 351° C. or lower, more preferably 150° C. or higher and 350° C. or lower, still more preferably 150° C. or higher and 330° C. or lower, further still more preferably 250° C. or higher and 330° C. or lower, and further still more preferably 250° C. or higher and 300° C. or lower from the viewpoint.

The core resin is preferably solidified in a shorter time during cooling after laser irradiation from a viewpoint of making deformation of a shaped object more difficult after laser irradiation. A difference in temperature between a temperature at which the core resin is softened (temperature at which the storage elastic modulus G' is $1\times10^{6.5}$ Pa: hereinafter also simply referred to as "$Tc_{(6.5)}$") and a temperature at which the core resin becomes hard to such an extent that the core resin is not deformed (temperature at which the storage elastic modulus G' is $1\times10^{7.0}$ Pa: "$Tc_{(7.0)}$") is preferably small from the viewpoint. Specifically, an absolute value of a difference between $Tc_{(7.0)}$ and $Tc_{(6.5)}$ ($|Tc_{(7.0)}-Tc_{(6.5)}|$) is preferably 10° C. or more and 100° C. or less, more preferably 10° C. or more and 80° C. or less, still more preferably 15° C. or more and 80° C. or less, further still more preferably 20° C. or more and 80° C. or less, and further still more preferably 20° C. or more and 50° C. or less.

In order to measure a temperature at which the storage elastic modulus G' of the core resin exhibits a specific numerical value in the resin particles having a core-shell structure, it is only required to measure viscoelastic characteristics of the resin particles having a core-shell structure as they are according to the above procedure. Meanwhile, in order to measure a temperature at which the storage elastic modulus G' of the shell resin exhibits a specific numerical value in the resin particles having a core-shell structure, it is only required to measure viscoelastic characteristics of the remaining shell resin according to the above procedure after a core component is removed, for example, by dissolving the resin particles in a solvent for dissolving only the core.

Incidentally, here, the core-shell structure means that the ratio of the area of a portion coated with the shell resin out of the surface of the particulate core resin is 90% or more. Practically, the ratio of a portion coated with the shell resin out of the surface of the core resin is actually measured for arbitrarily selected 10 core resins in an image obtained by imaging cross sections of many resin particles with a transmission electron microscope (TEM), and if the average value thereof is 90% or more, these resin particles are regarded to have the core-shell structure.

Figure 2B:
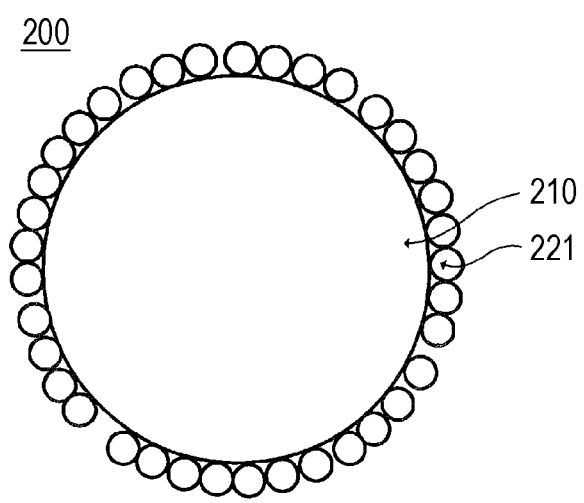

As illustrated in FIG. 2A which is a schematic cross-sectional view illustrating a form of a core-shell particle, the core-shell particle may be a resin particle 200 in which a core resin 210 is coated with a sheet-like shell resin 220. Alternatively, as illustrated in FIG. 2B which is a schematic cross-sectional view illustrating another form, the core-shell particle may be a resin particle 200 in which the core resin 210 is coated with a particulate shell resin 221.

The core resin preferably has an average particle diameter of 10 μm or more and 100 μm or less. When the average particle diameter is 10 μm or more, the powder material has sufficient flowability. Therefore, handling of the powder material at the time of manufacturing a three-dimensionally shaped object is easy. When the average particle diameter is 10 μm or more, the core resin is easily manufactured, and manufacturing cost of the powder material is not high. When the average particle diameter is 100 μm or less, a three-dimensionally shaped object with higher accuracy can be manufactured. The average particle diameter of the core resin is more preferably 10 μm or more and 80 μm or less, still more preferably 12 μm or more and 60 μm or less, further still more preferably 20 μm or more and 60 μm or less, and further still more preferably 30 μm or more and 60 μm or less from the viewpoint. Here, the thickness of the shell resin is actually measured at 10 points for randomly selected 10 resin particles in an image obtained by imaging cross sections of many resin particles with TEM, and the average value thereof is defined as the average thickness of the shell resin.

The average thickness of the shell resin is preferably smaller than the average particle diameter of the core resin, and more preferably equal to or less than a half of the average particle diameter of the core resin. Specifically, the average thickness of the shell resin is preferably 2 μm or more and 50 μm or less. When the average particle diameter is 2 μm or more, occurrence of aggregation between resin particles at the time of preheating is easily suppressed. When the average particle diameter is 50 μm or less, deformation such as warpage in a shaped object is easily suppressed. The average thickness of the shell resin is more preferably 3 μm or more and 50 μm or less, and still more preferably 5 μm or more and 30 μm or less.

Here, the average particle diameter of the particles means a volume average particle diameter measured by a dynamic light scattering method. The volume average particle diameter can be measured with a laser diffraction type particle size distribution measurement device (HELOS manufactured by SYMPATEC Gmbh) equipped with a wet type dispersing machine.

The amount of each of the core resin and the shell resin may be any amount as long as a resin particle having the core-shell structure is formed. For example, the amount of the shell resin with respect to 100 parts by mass of the core resin is preferably 0.1 parts by mass or more and 20 parts by mass or less, more preferably 0.5 parts by mass or more and 20 parts by mass or less, still more preferably 0.5 part by mass or more and 15 parts by mass or less, further still more preferably 1.0 part by mass or more and 15 parts by mass or less, and further still more preferably 1.0 part by mass or more and 10 parts by mass or less.

1-1-1-2. Laser absorbent

The powder material may further contain a laser absorbent from a viewpoint of more efficiently converting light energy of a laser into thermal energy. The laser absorbent may be any material as long as absorbing a laser having a Wavelength used and emitting heat. Examples of such a laser absorbent include a carbon powder, a nylon resin powder, a pigment, and a dye. These laser absorbents may be used singly or in combination of two types thereof.

The amount of the laser absorbent can be appropriately set within a range facilitating melting and bonding of the resin particles, and for example, can be set to a value of more than 0% by mass and less than 3% by mass with respect to the total mass of the powder material.

1-1-1-3. Flow Agent

The powder material may further contain a flow agent from a viewpoint of further improving flowability of the powder material and facilitating handling of the powder material at the time of manufacturing a three-dimensionally shaped object. The flow agent may be any material as long as having a small friction coefficient and a self-lubricating property. Examples of such a flow agent include silicon dioxide and boron nitride. These flow agents may be used singly or in combination of two types thereof. Even if flowability of the powder material is increased by the flow agent, the resin particles are unlikely to be charged, and the resin particles can be filled more densely when a thin film is formed.

The amount of the flow agent can be appropriately set within a range in which flowability of the powder material is further improved and the resin particles are sufficiently fused. For example, the amount of the flow agent can be more than 0% by mass and less than 2% by mass with respect to the total mass of the powder material.

1-1-1-4. Filler

The powder material may further contain a known filler from a viewpoint of increasing the strength of a shaped object. Examples of the filler include a carbon fiber, a glass fiber, a synthetic resin, a carbon nanotube, a glass bead, an aluminum granule, and titanium dioxide.

1-1-2. Thin Layer

The thickness of the thin layer is approximately the same as the thickness of a shaped object layer. The thickness of the thin layer can be arbitrarily set according to accuracy of a three-dimensionally shaped object to be manufactured, but is usually 0.01 mm or more and 0.30 mm or less. By setting the thickness of the thin layer to 0.01 mm or more, it is possible to prevent resin particles in a lower layer from being fused by laser irradiation for forming a next layer. By setting the thickness of the thin layer to 0.30 mm or less, energy of a laser can be conducted to a lower portion of the thin layer, and resin particles contained in the powder material constituting the thin layer can be sufficiently fused in the entire thickness direction. The thickness of the thin layer is more preferably 0.05 mm or more and 0.20 mm or less from the viewpoint. The thickness of the thin layer is preferably set such that a difference between the thickness of the thin layer and a laser beam spot diameter described later is within 0.10 mm from a viewpoint of sufficiently fusing resin particles in the entire thickness direction of the thin layer to make occurrence of cracking between laminated layers more difficult.

1-2. Step of Forming Shaped Object Layer in which Resin Particles Having Core-Shell Structure are Fused (Step (2))

In this step, a position where a shaped object layer is to be formed is selectively irradiated with a laser out of the formed thin layer, and core-shell particles at the irradiation position are fused. A surface temperature of the thin layer is set to be higher than $Tc_{(7.0)}$ at this time. The core-shell particles fused by laser irradiation are melted with adjacent powder to form a fused body, and become a shaped object layer. At this time, the core-shell particles that have received energy of a laser are also fused to a resin contained in the shaped object layer that has been formed. Therefore, adhesion between adjacent layers also occurs.

1-2-1. Laser Irradiation

The wavelength of a laser is only required to be set within a range absorbed by the shell resin. At this time, a difference between the wavelength of a laser and the wavelength at which the absorptance of the shell resin is highest is preferably set to be small. However, a resin can absorb light in various wavelength ranges. Therefore, it is preferable to use a laser having a wide wavelength band such as a $CO_2$ laser. For example, the wavelength of a laser is preferably 0.8 μm or more and 12 μm or less.

It is only required to set output conditions of a laser such that the storage elastic modulus G' of the core resin is $1 \times 10^{4.0}$ (Pa) or more and less than $1 \times 10^{8.0}$ (Pa).

For example, it is only required to set power at the time of laser output within a range where the shell resin is sufficiently fused at a laser scanning speed described later. Specifically, the power can be 5.0 W or more and 60 W or less. The power at the time of laser output is preferably 40 W or less, and more preferably 30 W or less from a viewpoint of lowering energy of the laser, lowering manufacturing cost, and simplifying the configuration of a manufacturing device.

It is only required to set a laser scanning speed within a range not increasing manufacturing cost and not making a device configuration excessively complicated. Specifically, the laser scanning speed is preferably 1 mm/sec or more and 100 mm/sec or less, more preferably 1 mm/sec or more and 80 mm/sec or less, still more preferably 2 mm/sec or more and 80 mm/sec or less, further still more preferably 3 mm/sec or more and 80 mm/sec or less, and further still more preferably 3 mm/sec or more and 50 mm/sec or less.

A laser beam diameter can be appropriately set according to accuracy of a three-dimensionally shaped object to be manufactured.

1-2-2. Surface Temperature of Thin Layer

During irradiation with the laser, the surface temperature of the thin layer is higher than $Tc_{(7.0)}$. At this time, a formed thin layer may be heated such that the surface temperature thereof is higher than $Tc_{(7.0)}$, or a thin layer having a surface temperature higher than $Tc_{(7.0)}$ may be formed by spreading a previously heated powder material.

By making the surface temperature of the thin layer higher than $Tc_{(7.0)}$, it is possible to soften the core resin before laser irradiation and to reduce a volume change of the core resin during laser irradiation. The above temperature corresponds to the temperature region T3 in FIG. 1 and is included in a temperature region higher than the endothermic peak P1 appearing when the temperature of the core resin contained in a shaped object layer formed by laser irradiation is lowered. Therefore, it is possible to suppress occurrence of warpage in a shaped object layer and reduction in strength of a three-dimensionally shaped object caused by local shrinkage of the core resin due to local cooling of the shaped object layer to a temperature lower than the endothermic peak P1 of the core resin.

The surface temperature of the thin layer is preferably higher than $Tc_{(7.0)}$ by 5° C. or more and 50° C. or less, more preferably by 5° C. or more and 30° C. or less from a viewpoint of further suppressing occurrence of warpage in the formed shaped object layer.

Meanwhile, the surface temperature of the thin layer is preferably lower than a temperature ($Ts_{(7.0)}$) at which the storage elastic modulus G' of the shell resin is $1 \times 10^{7.0}$ Pa from a viewpoint of suppressing reduction in shaping accuracy due to deformation of the core-shell particles before laser irradiation by softening of the shell resin or fusion of the core-shell particles before laser irradiation.

The surface temperature of the thin layer is preferably lower than an aggregation temperature of the core-shell particles from a viewpoint of suppressing reduction in strength of a three-dimensionally shaped object manufactured due to a decrease in density of the three-dimensionally shaped object by evaporation, thermal decomposition, or the like of the core-shell particles before laser irradiation. The aggregation temperature of the core-shell particles is a temperature at which the core-shell particles start to be aggregated due to softening, melting, and the like of the shell resin, and can be for example, a temperature at which a mass change ratio of the core-shell particles is 10% after the core-shell particles are held at the temperature for 10 minutes.

The formed thin layer may be heated from an upper surface thereof with a heater or the like, or may be heated from a side surface or a bottom surface of a space accommodating a shaped object during shaping. At this time, the surface temperature of the thin layer is likely to increase near the heater, and the surface temperature of the thin layer is more unlikely to increase as a distance from the heater increases. Therefore, the thin layer is preferably heated with a plurality of heaters disposed so as to be apart from each other from a viewpoint of making it difficult to cause temperature unevenness on a surface of the thin layer and making it difficult to cause deformation of a shaped object layer due to temperature unevenness of the surface of the thin layer.

1-3. Step of Laminating Shaped Object Layer (Step (3))

In this step, steps (1) and (2) are repeated to laminate a shaped object layer formed in step (2). By laminating the shaped object layer, a desired three-dimensionally shaped object is manufactured.

1-4. Others

At least step (2) is preferably performed under reduced pressure or in an inert gas atmosphere from a viewpoint of preventing reduction in strength of a three-dimensionally shaped object due to oxidation or the like of resin particles during fusion. A pressure during depressurization is preferably $1 \times 10^{-2}$ Pa or less, and more preferably $1 \times 10^{-3}$ Pa or less. Examples of an inert gas that can be used in the present embodiment include a nitrogen gas and a noble gas. Among these inert gases, a nitrogen ($N_2$) gas, a helium (He) gas, and an argon (Ar) gas are preferable from a viewpoint of availability. All of steps (1) to (3) are preferably performed under reduced pressure or in an inert gas atmosphere from a viewpoint of simplifying a manufacturing process.

2. Three-dimensionally shaping device

Figure 3:
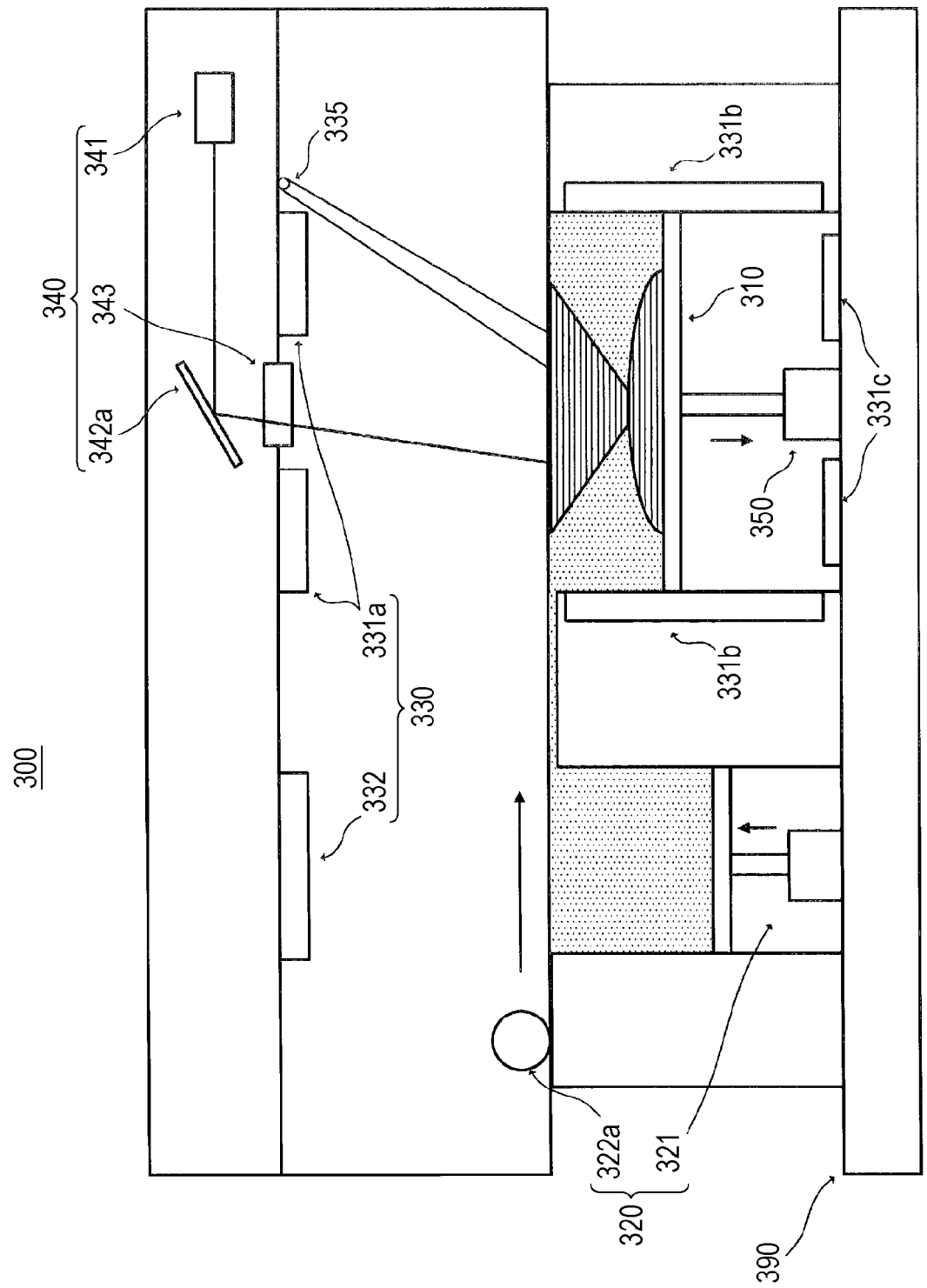
FIG. 3 is a side view schematically illustrating the configuration of a three-dimensionally shaping device according to an embodiment of the present invention.

The present embodiment relates to a device for manufacturing a three-dimensionally shaped object using the powder material. The device according to the present embodiment may have a similar configuration to a known device for manufacturing a three-dimensionally shaped object by a powder bed fusion method except for use of the powder material. Specifically, as illustrated in FIG. 3 which is a side view schematically illustrating the configuration of a three-dimensionally shaping device 300 according to the present embodiment, the three-dimensionally shaping device 300 includes: a shaping stage 310 located in an opening; a thin film former 320 for forming a thin film of a powder material containing resin particles having a core-shell structure on the shaping stage; a preheater 330 for making a surface temperature of a thin film formed on the shaping stage higher than $Tc_{(7.0)}$; a laser irradiator 340 for irradiating the thin film with a laser to form a shaped object layer in which the resin particles are fused; a stage support 350 for supporting the shaping stage 310 such that a position thereof in the vertical direction is variable; and a base 390 for supporting the above units.

Figure 4:
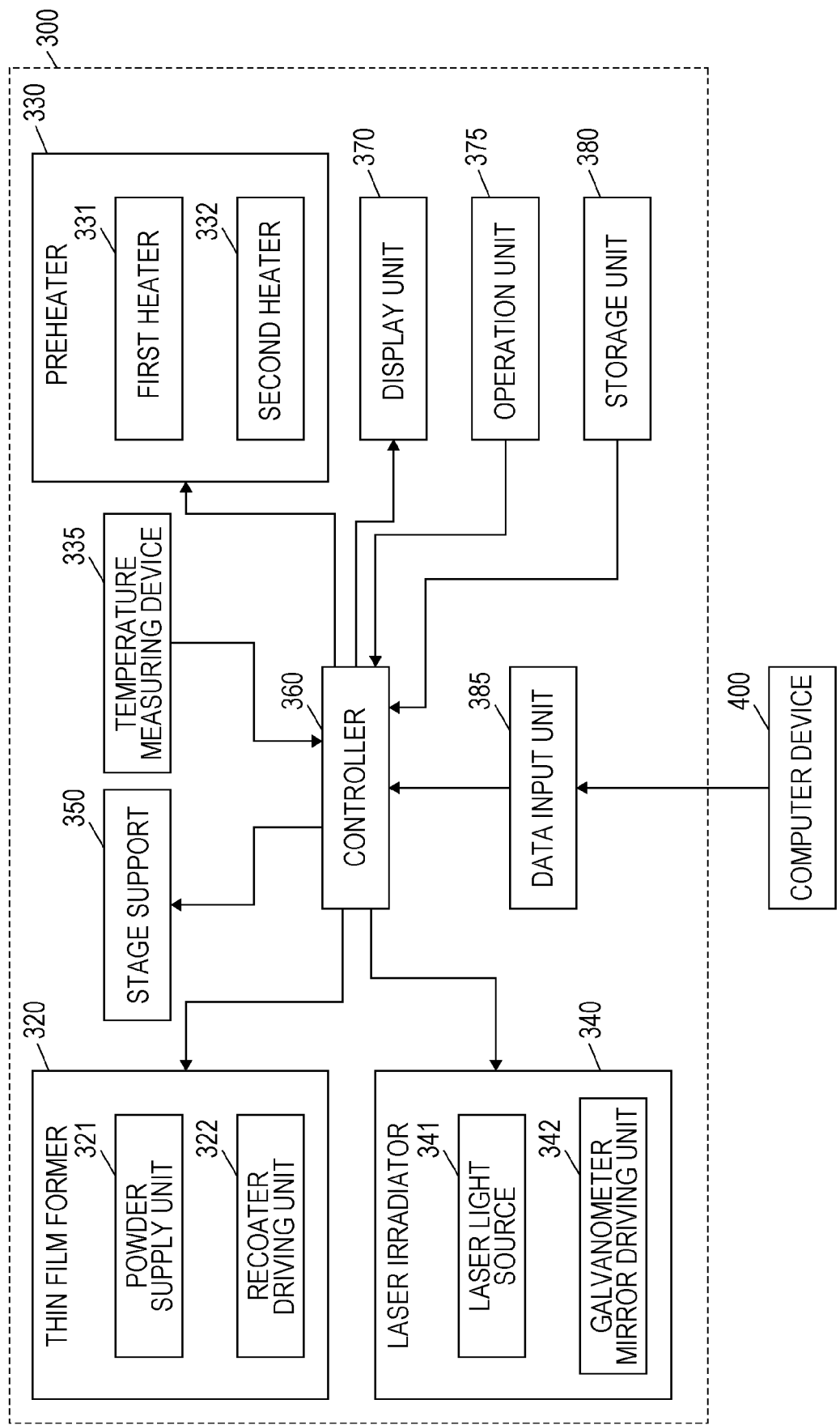
FIG. 4 is a diagram illustrating a main part of a control system of a three-dimensionally shaping device according to an embodiment of the present invention.

As illustrated in FIG. 4 illustrating a main part of a control system of the three-dimensionally shaping device 300, the three-dimensionally shaping device 300 may include: a controller 360 for controlling the thin film former 320, the preheater 330, the laser irradiator 340, and the stage support 350 to repeatedly form and laminate the shaped object layer; a display unit 370 for displaying various kinds of information; an operation unit 375 including a pointing device for accepting an instruction from a user; storage unit 380 for storing various kinds of information including a control program executed by the controller 360; and a data input unit 385 including an interface for transmitting/receiving various kinds of information such as three-dimensionally shaping data to/from an external device. The three-dimensionally shaping device 300 may include a temperature measuring device 335 for measuring the temperature of a region where a shaped object layer is to be formed out of a surface of a thin layer formed on the shaping stage 310. To the three-dimensionally shaping device 300, a computer device 400 for generating three-dimensionally shaping data may be connected.

On the shaping stage 310, a thin layer is formed by the thin film former 320, and a shaped object layer is formed by preheating the thin layer by the preheater 330 and laser irradiation by the laser irradiator 340. This shaped object layer is laminated to shape a three-dimensionally shaped object.

For example, the thin film former 320 may include: a powder supply unit 321 including an opening edge in which the shaping stage 310 rises or falls, an opening having an edge thereof on the substantially same plane in the horizontal direction, a powder material storing unit extending downward in the vertical direction from the opening, and a supply piston disposed at a bottom of the powder material storing unit and rising or falling in the opening; and a recoater 322a for spreading a supplied powder material flatly on the shaping stage 310 to form a thin layer of the powder material.

Note that the powder supply unit 321 may include a powder material storing unit disposed above the shaping stage 310 in the vertical direction and a nozzle to discharge a powder material onto the same plane as the shaping stage in the horizontal direction.

The preheater 330 may be any unit as long as being able to heat at least a region where a shaped object layer is to be formed out of the surface of the thin layer and being able to maintain the temperature. For example, the preheater 330 may include a first heater 331 capable of heating a surface of a thin layer formed on the shaping stage 310, or may further include a second heater 332 for heating a powder material before being supplied onto the shaping stage. The preheater 330 may selectively heat a region where the shaped object layer is to be formed, or may heat the entire inside of the device to adjust the temperature of a surface of the formed thin film to a predetermined temperature.

The first heater 331 may be a heater 331a for heating the thin layer from an upper surface thereof, a heater 331b for heating the thin layer from a side surface thereof, a heater 331c for heating the thin layer from a bottom surface thereof, or any combination thereof. However, the surface temperature of the thin layer is likely to increase near the first heaters 331a, 331b, and 331c and is more unlikely to increase as a distance from the first heaters 331a, 331b, and 331c increases. Therefore, the first heater 331 preferably includes a plurality of heaters disposed so as to be apart from each other from a viewpoint of making it difficult to cause temperature unevenness on a surface of the thin layer and making it difficult to cause deformation of a shaped object layer due to temperature unevenness on the surface of the thin layer. At this time, the plurality of first heaters 331a are preferably disposed at equal intervals, the plurality of first heaters 331b are preferably disposed at equal intervals, and the plurality of first heaters 331c are preferably disposed at equal intervals.

The temperature measuring device 335 may be any device as long as being able to measure the surface temperature of a region where the shaped object layer is to be formed in a non-contact manner, and can be for example, an infrared sensor or an optical pyrometer.

The laser irradiator 340 includes a laser light source 341 and a galvanometer mirror 342a. The laser irradiator 340 may include a laser window 343 for transmitting a laser and a lens (not illustrated) for matching a focal length of the laser with the surface of the thin layer.

The laser light source 341 may be any light source as long as emitting a laser having the above wavelength at the above output. Examples of the laser light source 341 include a YAG laser light source, a fiber laser light source, and a $CO_2$ laser light source. The galvanometer mirror 342a may include an X mirror for reflecting a laser emitted from the laser light source 341 and performing scanning with the laser in an X direction and a Y mirror for reflecting a laser emitted from the laser light source 341 and performing scanning with the laser in a Y direction. The laser window 343 may be any window as long as being formed of a material transmitting a laser.

The stage support 350 supports the shaping stage 310 such that a position thereof in the vertical direction is variable. That is, the shaping stage 310 is accurately movable in the vertical direction by the stage support 350. The stage support 350 can adopt various configurations, and for example, may include a holding member for holding the shaping stage 310, a guide member for guiding the holding member in the vertical direction, a ball screw engaged with a screw hole formed in the guide member, and the like.

The controller 360 includes a hardware processor such as a central processing unit and controls overall operation of the three-dimensionally shaping device 300 during shaping operation of a three-dimensionally shaped object.

The controller 360 may, for example, convert three-dimensionally shaping data acquired from the computer device 400 by the data input unit 385 into a plurality of pieces of slice data thinly cut in a laminating direction of a shaped object layer. The slice data is shaping data of each shaped object layer for shaping a three-dimensionally shaped object. The thickness of the slice data, that is, the thickness of a shaped object layer coincides with a distance (lamination pitch) according to the thickness of one shaped object layer.

The display unit 370 may be, for example, a liquid crystal display or a monitor.

The operation unit 375 may include a pointing device such as a keyboard or a mouse, and may include various operation keys such as a ten key, an execution key, and a start key.

The storage unit 380 may include various storage media such as ROM, RAM, a magnetic disk, HDD, and SSD.

The three-dimensionally shaping device 300 may include a depressurization unit (not illustrated) for depressurizing the inside of the device under control of the controller 360, such as a depressurization pump, or an inert gas supply unit (not illustrated) for supplying an inert gas into the device under control of the controller 360.

2-1. Three-Dimensionally Shaping Using Three-Dimensionally Shaping Device 300

The controller 360 converts three-dimensionally shaping data acquired from the computer device 400 by the data input unit 385 into a plurality of pieces of slice data thinly cut in a laminating direction of a shaped object layer. Thereafter, the controller 360 controls the following operation in the three-dimensionally shaping device 300.

The powder supply unit 321 drives a motor and a drive mechanism (none of which is illustrated) according to supply information output from the controller 360 to move a supply piston upward in the vertical direction (arrow direction in the drawing) and to extrude a powder material onto the same plane as the shaping stage in the horizontal direction.

Thereafter, a recoater driving unit 322 moves the recoater 322a in the horizontal direction (arrow direction in the drawing) according to thin film forming information output from the controller 360, conveys the powder material to the shaping stage 310, and presses the powder material such that the thickness of a thin layer corresponds to the thickness of one shaped object layer.

The preheater 330 heats a surface of the formed thin layer or the entire inside of the device according to temperature information output from the controller 360. The temperature information may be, for example, information for heating the surface of the thin layer to a temperature higher than the temperature $Tc_{(7.0)}$ which the controller 360 has extracted from the storage unit 380 based on data of a core resin and a shell resin input from the data input unit 385 and lower than $Ts_{(7.0)}$ or lower than a decomposition temperature of core-shell particles. When the preheater 330 includes the first heater 331, the first heater 331 may start heating after a thin layer is formed, or may start heating of a portion corresponding to a surface of a thin layer to be formed or the inside of the device before the thin layer is formed.

Thereafter, the laser irradiator 340 emits a laser from the laser light source 341 such that the laser fits in a region constituting a three-dimensionally shaped object in each piece of slice data on the thin film according to laser irradiation information output from the controller 360. A galvanometer mirror driving unit 342 drives the galvanometer mirror 342a, and scanning with the laser is performed. Resin particles contained in the powder material are fused by laser irradiation to form a shaped object layer.

Thereafter, the stage support 350 drives a motor and a driving mechanism (none of which is illustrated) according to position control information output from the controller 360 to move the shaping stage 310 downward in the vertical direction (arrow direction in the drawing) by a lamination pitch.

The display unit 370 displays various kinds of information and messages to be recognized by a user under control of the controller 360 as necessary. The operation unit 375 accepts various input operations by a user and outputs operation signals according to the input operations to the controller 360. For example, when a virtual three-dimensionally shaped object to be formed is displayed on the display unit 370, it is confirmed whether or not a desired shape is formed, and the desired shape is not formed, the operation unit 375 may make modification.

The controller 360 stores data in the storage unit 380 or extracts data from the storage unit 380 as necessary.

The controller 360 may receive information on the temperature of a region where a shaped object layer is to be formed out of the surface of the thin layer from the temperature measuring device 335, and may control heating by the preheater 330 such that a difference between the temperature of the region where the shaped object layer is to be formed and the temperature $Tc_{(6.5)}$ at which the storage elastic modulus G' of the core resin is $1 \times 10^{6.5}$ Pa is 5° C. or more and 50° C. or less, and preferably 5° C. or more and 30° C. or less.

By repeating these operations, a shaped object layer is laminated to manufacture a three-dimensionally shaped object.

EXAMPLES

Specific Examples of the present invention will be described below. Note that the scope of the present invention is not construed as being limited by these Examples.

1. Manufacture of Powder Material

Particles containing a thermoplastic resin were manufactured by the following procedure.

1-1. Powder Material 1

100 parts by mass of nylon 6 particles obtained by treating Alamine CM1001 manufactured by Toray Industries, Ltd. by a mechanical pulverization method (freeze pulverization method) so as to have an average particle diameter of 50 μm (temperature $Tc_{(7.0)}$ at which the storage elastic modulus G' is $1 \times 10^{7.0}$: 225° C.) and a polyarylate resin solution obtained by dissolving 5 parts by mass of polyarylate resin (temperature at which the storage elastic modulus G' is $1 \times 10^{8.0}$: 265° C., G' at $Tc_{(7.0)}$ (225° C.): $1 \times 10^{9.0}$ Pa) in 50 parts by mass of tetrahydrofuran were prepared. Using these, core-shell type particles in which surfaces of the nylon 6 particles were coated with the polyarylate resin were obtained by a wet coating method. The obtained particles were referred to as powder material 1.

1-2. Powder Material 2

100 parts by mass of nylon 12 particles obtained by treating UBESTA manufactured by UBE Industries, Ltd. ("UBESTA" is a registered trademark of UBE Industries, Ltd.) by a mechanical pulverization method (freeze pulverization method) so as to have an average particle diameter of 50 μm (temperature $Tc_{(7.0)}$ at which the storage elastic modulus G' is $1 \times 10^{7.0}$: 160° C.) and a polyarylate resin solution obtained by dissolving 5 parts by mass of polyarylate resin (temperature at which the storage elastic modulus G' is $1 \times 10^{8.0}$: 210° C., G' at $Tc_{(7.0)}$ (160° C.): $1 \times 10^{9.0}$ Pa) in 50 parts by mass of tetrahydrofuran were prepared. Using these, core-shell type particles in which surfaces of the nylon 12 particles were coated with the polyarylate resin were obtained by a wet coating method. The obtained particles were referred to as powder material 2.

1-3. Powder material 3

100 parts by mass of polycarbonate particles obtained by treating Calibre 301-4 ("Calibre" is a registered trademark of Trinseo) manufactured by Sumika Styron Ltd. by a mechanical pulverization method (freeze pulverization method) so as to have an average particle diameter of 50 μm (temperature $Tc_{(7.0)}$ at which the storage elastic modulus G' is $1 \times 10^{7.0}$: 155° C.) and a polycarbonate resin solution obtained by dissolving 5 parts by mass of polycarbonate resin (PCZ-200 manufactured by Mitsubishi Gas Chemical Company, Inc., temperature at which the storage elastic modulus G' is $1 \times 10^{8.0}$: 180° C., G' at $Tc_{(7.0)}$ (155° C.): $1 \times 10^{9.0}$ Pa) in 50 parts by mass of tetrahydrofuran were prepared. Using these, core-shell type particles in which surfaces of the polycarbonate particles were coated with the polycarbonate resin were obtained by a wet coating method. The obtained particles were referred to as powder material 3.

1-4. Powder Material 4

100 parts by mass of polyphenylene sulfide particles obtained by treating PPS(NC)SS manufactured by Toray Plastic Seiko Co., Ltd. by a mechanical pulverization method (freeze pulverization method) so as to have an average particle diameter of 50 μm (temperature $Tc_{(7.0)}$ at which the storage elastic modulus G' is $1 \times 10^{7.0}$: 260° C.) and a modified polycarbonate resin solution obtained by dissolving 5 parts by mass of modified polycarbonate resin (PCZ-200 manufactured by Mitsubishi Gas Chemical Company, Inc., temperature at which the storage elastic modulus G' is $1 \times 10^{8.0}$: 265° C., G' at $Tc_{(7.0)}$ (260° C.): $1 \times 10^{9.0}$ Pa) in 50 parts by mass of tetrahydrofuran were prepared. Using these, core-shell type particles in which surfaces of the polycarbonate particles were coated with the modified polycarbonate resin were obtained by a wet coating method. To the obtained particles, 30 parts by mass of glass beads (EJ-1200 manufactured by Potters-Ballotini Co., Ltd.) were added and mixed, and the resulting mixture was referred to as powder material 4.

1-5. Powder Material 5

Nylon 6 particles obtained by treating Alamine CM1001 manufactured by Toray Industries, Inc. by a mechanical pulverization method (freeze pulverization method) so as to have an average particle diameter of 50 μm (temperature $Tc_{(7.0)}$ at which the storage elastic modulus G' is $1 \times 10^{7.0}$: 225° C.) was referred to as powder material 5.

1-6. Powder Material 6

100 parts by mass of nylon 6 particles obtained by treating Alamine CM1001 manufactured by Toray Industries, Ltd. by a mechanical pulverization method (freeze pulverization method) so as to have an average particle diameter of 50 μm (temperature $Tc_{(7.0)}$ at which the storage elastic modulus G' is $1 \times 10^{7.0}$: 225° C.) and a polyarylate resin solution obtained by dissolving 5 parts by mass of polycarbonate resin (PCZ-200 manufactured by Mitsubishi Gas Chemical Company, Inc., temperature at which the storage elastic modulus G' is $1 \times 10^{8.0}$: 180° C., G' at $Tc_{(7.0)}$ (225° C.): $1 \times 10^{9.0}$ Pa) in 50 parts by mass of tetrahydrofuran were prepared. Using these, core-shell type particles in which surfaces of the nylon 6 particles were coated with the polycarbonate resin were obtained by a wet coating method. The obtained particles were referred to as powder material 6.

(Measurement of Average Particle Diameter)

The particle diameters of 100 particles arbitrarily selected from particles in a microscope image of a powdery material imaged with a transmission electron microscope (TEM) were measured, and the average value thereof was taken as the average particle diameter of the resin particles.

2. Evaluation 2-1. Decomposition temperature

Each of powder materials 1 to 6 weighed at 1 g was put in a glass bottle, tapped, placed on a hot plate kept at a plurality of temperatures, and allowed to stand for 10 minutes. After standing, the coated particles were taken out from the glass bottle and weighed.

A temperature at which a value (unit: %) obtained by dividing a decrease in mass of the resin after standing (value obtained by subtracting the mass of the resin after standing from 1 g) by the mass (1 g) of the resin after standing exceeded 10% was taken as the decomposition temperature of the particles.

2-2. Shape of Shaped Object

Each of powder materials 1 to 6 was put in a three-dimensionally shaping device (Sinterstation Hi-Q manufactured by 3D Systems, Inc.) by a powder bed fusion method. Setting was performed such that the surface temperature of a thin layer of each of the powder materials was the standby temperature illustrated in Table 1. Laser irradiation was performed from a 50 W fiber laser (manufactured by SPI Lasers Co., Ltd.) equipped with a YAG wavelength galvanometer scanner under the following conditions to manufacture each of shaped objects 1 to 6 having the shape of a 1A type test piece described in JIS K 7161. A shaped object 7 was similarly manufactured using powder material 1 except that the standby temperature was changed to the temperature illustrated in Table 1.

[Laser Emitting Conditions]

Laser output: 20 W

Wavelength of laser: 1.07 μm

Beam diameter: 170 μm on thin layer surface

[Laser Scanning Conditions]
Scanning speed: 3.0 mm/sec
Scanning interval: 0.2 mm
[Ambient Atmosphere]
Temperature: normal temperature
Gas: argon (Ar) 100%

Shaped objects 1 to 7 were visually observed, and it was confirmed whether or not accuracy (length 15 mm× width 20 mm) intended to achieve by shaping was achieved and whether or not warpage occurred in the shaped objects. When the accuracy was achieved and warpage was not observed, the object was evaluated to have no problem.

2-3. Maximum tensile stress

Each of the shaped objects 1 to 7 was set in a tensile tester (Tensilon RTC-1250 manufactured by A & D Co., Ltd.) and pulled in a longitudinal direction at a speed of 50 mm/min. A stress at Which breaking occurred was measured and taken as a maximum tensile stress.

Table 1 illustrates the type of core resin, temperature $Tc_{(7.0)}$ at which the storage elastic modulus G' of the core resin is $1\times10^{7.0}$ Pa, the type of shell resin, temperature $Ts_{(8.0)}$ at which the storage elastic modulus G' of the shell resin is $1\times10^{8.0}$ Pa, a standby temperature, and evaluation results of the decomposition temperature, the shape of a shaped object, and a maximum tensile stress for each of shaped objects 1 to 7.

Incidentally, in Table 1, "PA6" represents nylon 6, "PA12" represents nylon 12, "PC" represents polycarbonate, "PPS" represents polyphenylene sulfide, and "PAR" represents polyarylate. In Table 1, "poor accuracy" indicates that particles not irradiated with a laser were fused, and a shaped object spread more.

Meanwhile, in shaped object 5 manufactured similarly from powder material 5 containing resin particles other than the core-shell particles, the resin particles were softened and deformed before laser irradiation, and the whole resin constituting the powder material was solidified. As a result, it was impossible to manufacture a shaped object having a shape that can be evaluated for a maximum tensile stress.

In shaped object 6 manufactured similarly from powder material 6 in which the storage elastic modulus G' of the shell resin is less than $1\times10^{8.0}$ Pa at the temperature $Tc_{(7.0)}$ at which the storage elastic modulus G' of the core resin is $1\times10^{7.0}$ Pa, accuracy was low, and it was impossible to manufacture a shaped object having a shape that can be evaluated for a maximum tensile stress. It is considered that this is because the resin particles were softened and deformed before laser irradiation and the shaped object layer was locally cooled and shrunk.

In shaped object 7 manufactured by setting the surface temperature of the thin layer during laser irradiation to be lower than $Tc_{7.0)}$ although powder material 1 was used, warpage occurred in each layer and delamination occurred. As a result, it was impossible to manufacture a shaped object having a shape that can be evaluated for a maximum tensile stress.

The present application claims a priority based on Japanese Patent Application No. 2016-219943 filed on Nov. 10, 2016, and the contents described in the claims, the description, and the drawings of the application are incorporated into the present application.

INDUSTRIAL APPLICABILITY

The method for manufacturing a powder material according to the present invention makes more accurate shaping possible by a powder bed fusion method. Therefore, the present invention can contribute to further spread of the powder bed fusion method.

TABLE 1

| Shaped object No. | Powder material No. | Core resin | | Shell resin | | | | Standby temperature | Evaluation | | |
|---|---|---|---|---|---|---|---|---|---|---|---|
| | | | | | | | | | De-composition temperature | Shape of shaped object | Maximum tensile stress |
| | | Type | $Tc_{(7.0)}$ | Type | $Ts_{(7.0)}$ | $Ts_{(8.0)}$ | G' at $Tc_{(7.0)}$ | | | | |
| 1 | 1 | PA6 | 225° C. | PAR | 275° C. | 265° C. | $1\times10^{9.0}$ Pa | 230° C. | 240° C. | No problem | 61 MPa |
| 2 | 2 | PA12 | 160° C. | PAR | 230° C. | 210° C. | $1\times10^{9.0}$ Pa | 180° C. | 200° C. | No problem | 35 MPa |
| 3 | 3 | PC | 155° C. | PC | 185° C. | 180° C. | $1\times10^{9.0}$ Pa | 160° C. | 170° C. | No problem | 70 MPa |
| 4 | 4 | PPS | 260° C. | PC | 280° C. | 265° C. | $1\times10^{9.0}$ Pa | 280° C. | 270° C. | No problem | 75 MPa |
| 5 | 5 | PA6 | 225° C. | — | — | — | — | 230° C. | 210° C. | Shaping is impossible | X |
| 6 | 6 | PA6 | 225° C. | PC | 185° C. | 180° C. | $1\times10^{9.0}$ Pa | 230° C. | 210° C. | Poor accuracy | X |
| 7 | 1 | PA6 | 225° C. | PAR | 275° C. | 265° C. | $1\times10^{9.0}$ Pa | 190° C. | 240° C. | Warpage has occurred | X |

Each of shaped objects 1 to 4 manufactured by forming a thin layer of each of powder materials 1 to 4 containing core-shell type resin particles containing a core resin and a shell resin with a storage elastic modulus G' of $1\times10^{8.0}$ Pa or more at a temperature $Tc_{(7.0)}$ at which the storage elastic modulus G' of the core resin is $1\times10^{7.0}$ Pa, setting the surface temperature of the thin layer to be higher than $Tc_{(7.0)}$, and selectively irradiating the formed thin layer with laser light had high accuracy of a shaped object and a higher maximum tensile stress.

REFERENCE SIGNS LIST

200 Resin particle
210 Core resin
220 Shell resin
221 Shell resin
300 Three-dimensionally shaping device 310 Shaping stage
320 Thin film former
321 Powder supply unit
322 Recoater driving unit
322a Recoater
330 Preheater
331, 331a, 331b, 331c First heater
332 Second heater
335 Temperature measuring device
340 Laser irradiator
341 Laser light source
342 Galvanometer mirror driving unit
342a Galvanometer mirror
343 Laser window
350 Stage support
360 Controller
370 Display unit
375 Operation unit
380 Storage unit
385 Data input unit
390 Base
400 Computer device

The invention claimed is:

1. A method for manufacturing a three-dimensionally shaped object, the method comprising:
    forming a thin layer of a powder material containing core-shell type resin particles containing a core resin and a shell resin with a storage elastic modulus G' of $1\times10^{8.0}$ Pa or more at a temperature $Tc_{(7.0)}$ at which the storage elastic modulus G' of the core resin is $1\times10^{7.0}$ Pa;
    selectively irradiating the formed thin layer with laser light to form a shaped object layer in which the resin particles contained in the powder material are sintered or fused; and
    performing the forming of the thin layer and the forming of the shaped object layer in this order a plurality of times to laminate the shaped object layer, wherein
    in the forming of the shaped object layer, a surface temperature of the thin layer is higher than $Tc_{(7.0)}$.

2. A method for manufacturing a three-dimensionally shaped object, the method comprising:
    forming a thin layer of a powder material containing core-shell type resin particles containing a core resin and a shell resin in which a temperature $Ts_{(8.0)}$ at which a storage elastic modulus G' is $1\times10^{8.0}$ Pa is higher than a temperature $Tc_{(7.0)}$ at which the storage elastic modulus G' of the core resin is $1\times10^{7.0}$ Pa;
    selectively irradiating the formed thin layer with laser light to form a shaped object layer in which the resin particles contained in the powder material are sintered or fused; and
    performing the forming of the thin layer and the forming of the shaped object layer in this order a plurality of times to laminate the shaped object layer, wherein
    in the forming of the shaped object layer, a surface temperature of the thin layer is higher than $Tc_{(7.0)}$.

3. The method for manufacturing a three-dimensionally shaped object according to claim 1, wherein in the forming of the shaped object layer, the surface temperature of the thin layer is lower than a temperature $Ts_{(7.0)}$ at Which the storage elastic modulus G of the shell resin is $1\times10^{7.0}$ Pa.

4. The method for manufacturing a three-dimensionally shaped object according to claim 1, wherein in the forming of the shaped object layer, the surface temperature of the thin layer is lower than a temperature at which a mass change ratio is 10% when the core-shell type resin particles are held for 10 minutes.

5. The method for manufacturing a three-dimensionally shaped object according to claim 1, wherein the core resin has an average particle diameter of 10 µm or more and 100 µm or less.

6. The method for manufacturing a three-dimensionally shaped object according to claim 1, wherein each of the core resin and the shell resin is selected from the group consisting of a high density polyethylene (HDPE), a low density polyethylene (LDPE), polypropylene (PP), a nylon resin (PA), polyacetal (POM), polybutylene terephthalate (PBT), polyphenylene sulfide (PPS), polyether ether ketone (PEEK), a liquid crystal polymer (LCP), polystyrene (PS), polyvinyl chloride (PVC), an ABS resin, an acrylic resin (PMMA), polycarbonate (PC), polyarylate (PAR), and modified polyphenylene ether (PPE).

7. A three-dimensionally shaping device comprising:
    a shaping stage;
    a thin film former that forms (a) a thin film of a powder material containing core-shell type resin particles containing a core resin and a shell resin with a storage elastic modulus G' of $1\times10^{8.0}$ Pa or more at a temperature $Tc_{(7.0)}$ at which the storage elastic modulus G' of the core resin is $1\times10^{7.0}$ Pa on the shaping stage, or a thin film former that forms a thin film of a powder material containing core-shell type resin particles containing a core resin and a shell resin in which a temperature $Ts_{(8.0)}$ at which a storage elastic modulus G' is $1\times10^{8.0}$ Pa is higher than a temperature $Tc_{(7.0)}$ at which the storage elastic modulus G' of the core resin is $1\times10^{7.0}$ Pa on the shaping stage;
    a preheater that makes a surface temperature of the formed thin layer of the powder material higher than $Tc_{(7.0)}$;
    a laser irradiator that irradiates the thin film with a laser to form a shaped object layer in which the particles are sintered or fused;
    a stage support that variably supports the shaping stage such that a position thereof in a vertical direction is variable; and
    a controller that controls the thin film former, the laser irradiator, and the stage support to repeatedly form and laminate the shaped object layer.

8. The method for manufacturing a three-dimensionally shaped object according to claim 2, wherein in the forming of the shaped object layer, the surface temperature of the thin layer is lower than a temperature $Ts_{(7.0)}$ at which the storage elastic modulus G' of the shell resin is $1\times10^{7.0}$ Pa.

9. The method for manufacturing a three-dimensionally shaped object according to claim 2, wherein in the forming of the shaped object layer, the surface temperature of the thin layer is lower than a temperature at which a mass change ratio is 10% when the core-shell type resin particles are held for 10 minutes.

10. The method for manufacturing a three-dimensionally shaped object according to claim 2, wherein the core resin has an average particle diameter of 10 µm or more and 100 µm or less.

11. The method for manufacturing a three-dimensionally shaped object according to claim 2, wherein each of the core resin and the shell resin is selected from the group consisting of a high density polyethylene (HDPE), a low density polyethylene (LDPE), polypropylene (PP), a nylon resin (PA), polyacetal (POM), polybutylene terephthalate (PBT), polyphenylene sulfide (PPS), polyether ether ketone (PEEK), a liquid crystal polymer (LCP), polystyrene (PS), polyvinyl chloride (PVC), an ABS resin, an acrylic resin (PMMA), polycarbonate (PC), polyarylate (PAR), and modified polyphenylene ether (PPE).

12. The method for manufacturing a three-dimensionally shaped object according to claim 3, wherein the core resin has an average particle diameter of 10 µm or more and 100 µm or less.

13. The method for manufacturing a three-dimensionally shaped object according to claim 3, wherein each of the core resin and the shell resin is selected from the group consisting of a high density polyethylene (HDPE), a low density polyethylene (LDPE), polypropylene (PP), a nylon resin (PA), polyacetal (POM), polybutylene terephthalate (PBT), polyphenylene sulfide (PPS), polyether ether ketone (PEEK), a liquid crystal polymer (LCP), polystyrene (PS), polyvinyl chloride (PVC), an ABS resin, an acrylic resin (PMMA), polycarbonate (PC), polyarylate (PAR), and modified polyphenylene ether (PPE).

14. The method for manufacturing a three-dimensionally shaped object according to claim 4, wherein the core resin has an average particle diameter of 10 µm or more and 100 µm or less.

15. The method for manufacturing a three-dimensionally shaped object according to claim 4, wherein each of the core resin and the shell resin is selected from the group consisting of a high density polyethylene (HDPE), a low density polyethylene (LDPE), polypropylene (PP), a nylon resin (PA), polyacetal (POM), polybutylene terephthalate (PET), polyphenylene sulfide (PPS), polyether ether ketone (PEEK), a liquid crystal polymer (LCP), polystyrene (PS), polyvinyl chloride (PVC), an ABS resin, an acrylic resin (PMMA), polycarbonate (PC), polyarylate (PAR), and modified polyphenylene ether (PPE).

16. The method for manufacturing a three-dimensionally shaped object according to claim 5, wherein each of the core resin and the shell resin is selected from the group consisting of a high density polyethylene (HDPE), a low density polyethylene (LDPE), polypropylene (PP), a nylon resin (PA), polyacetal (POM), polybutylene terephthalate (PBT), polyphenylene sulfide (PPS), polyether ether ketone (PEEK), a liquid crystal polymer (LCP), polystyrene (PS), polyvinyl chloride (PVC), an ABS resin, an acrylic resin (PMMA), polycarbonate (PC), polyarylate (PAR), and modified polyphenylene ether (PPE).

* * * * *